C. M. P. MONTBARBON & G. E. CHÉDRU.
H. WAEL, ADMINISTRATOR OF C. M. P. MONTBARBON, DEC'D.
INTERNAL COMBUSTION ENGINE.
APPLICATION FILED FEB. 27, 1914.

1,219,983.

Patented Mar. 20, 1917.
4 SHEETS—SHEET 1.

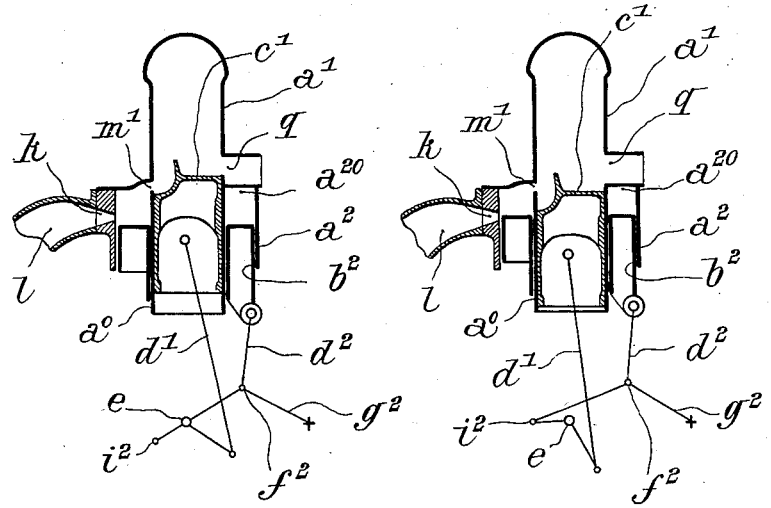
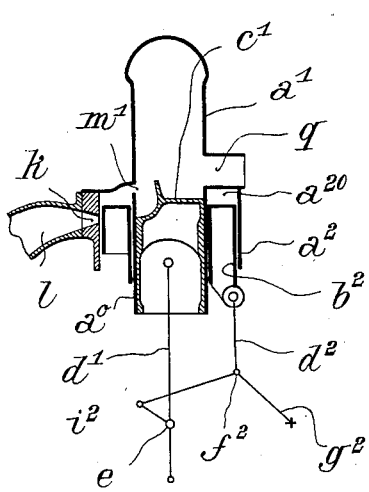
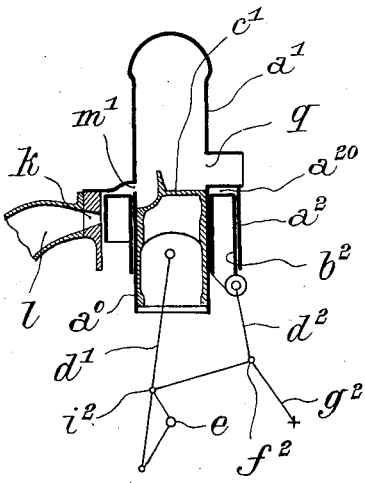

UNITED STATES PATENT OFFICE.

CHARLES MAURICE PHILIPPE MONTBARBON, OF NEUILLY-SUR-SEINE, AND GUSTAVE EMILE CHÉDRU, OF ALFORT, FRANCE; HENRI WAEL, OF LEVALLOIS-PERRET, FRANCE, ADMINISTRATOR OF SAID CHARLES M. P. MONTBARBON, DECEASED.

INTERNAL-COMBUSTION ENGINE.

1,219,983.   Specification of Letters Patent.   Patented Mar. 20, 1917.

Application filed February 27, 1914. Serial No. 821,469.

*To all whom it may concern:*

Be it known that we, CHARLES MAURICE PHILIPPE MONTBARBON and GUSTAVE EMILE CHÉDRU, citizens of the French Republic, residing at, the first, Neuilly-Sur-Seine, Seine, and, the second, Alfort, Seine, France, have invented certain new and useful Improvements in Internal-Combustion Engines, of which the following is a specification.

This invention relates to two-stroke internal combustion engines of the kind having a differential cylinder of greater outside diameter than the main cylinder, which outside cylinder forms an annular pump having a piston distinct from the main piston, and a port arrangement such that the fresh gases drawn in by the pump are transferred directly from the latter into the main cylinder, without having been previously subjected to compression. The invention comprises the construction of the annular pump by extending the wall of the main cylinder to form the interior wall of the differential cylinder.

The invention further consists in certain other arrangements more fully referred to hereinafter and claimed in the claims.

A construction of the invention is shown in the accompanying drawings in which—

Figs 2–13 show diagrammatically the same engine in twelve successive positions, corresponding to the angular movements of 30° each of the crank shaft.

Figure 1:
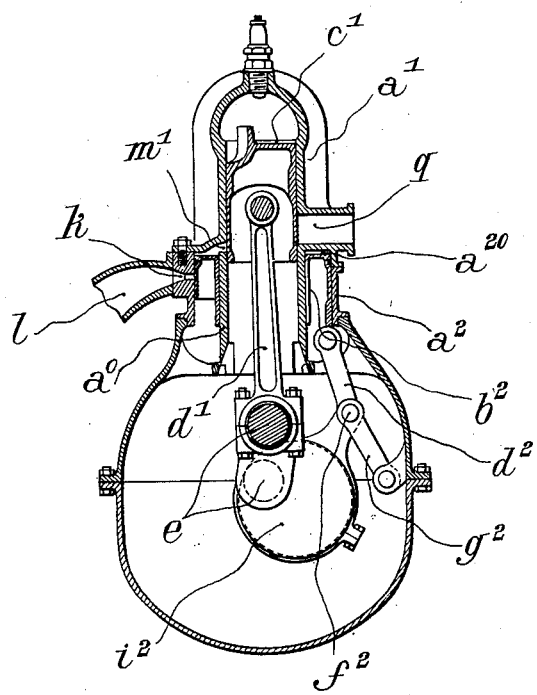
Figure 1 shows in axial section, in a direction at right angles to the crank shaft, a two-stroke internal combustion engine constructed according to the invention.

According to this invention the wall of the main cylinder $a^1$ is extended beyond the surface $a^{20}$ connecting the main cylinder to the wall of greater diameter of the differential cyinder $a^2$ so that the extension $a^0$ of the said wall constitutes, with the said connection surface $a^{20}$ and the said portion $a^2$, an annular chamber suitable for forming the body of the charging pump and receiving the differential piston $b^2$.

The piston $c^1$ is connected in the known manner, for instance by means of a connecting rod $d^1$, to the crank of the shaft $e$ with which the engine is provided and the piston $b^2$ is connected, also in the known manner, to the shaft $e$ by using such a gear that the movement which it imparts to the piston $b^2$ is of smaller amplitude than that which is imparted to the piston $c^1$ and that the movement of the piston $b^2$ is in advance with respect to the movement of the piston $c^1$. The gear for driving the piston $b^2$ is preferably so made that the piston $b^2$ arrives at the end of its down stroke, only a short time before the piston $c^1$ arrives at the end of its down stroke and the piston $b^2$ arrives at the end of its upstroke a long time before the piston $c^1$ has completed its upstroke, that is to say, before the upper face of the piston $c^1$ passes in its upstroke, the upper face of the piston $b^2$ when the latter is at the end of its upstroke. For that purpose is used, a gear for driving the piston $b^2$ so that the said piston, remains for a certain time practically stationary when it is in the neighborhood of its upper dead point and that it effects more quickly than the piston $c^1$ its up and down strokes. This gear is constituted by a connecting rod $d^2$ pivoted at one end to the piston $b^2$, and at its other end to a pin $f^2$ connected simultaneously to an arm which, either (as shown in the drawing) is secured to an eccentric keyed to the engine shaft with an advance of about 120° relatively to the crank of the piston $c^1$, or, (not shown in the drawing) pivoted to the pin $i^2$ of a crank keyed in the same manner to the said engine shaft, and also pivoted to an arm $g^2$ made of such a length and pivoted to the frame at such a point that when, the engine shaft rotates the said arm $g^2$ is forced to oscillate between two end positions between which it occupies, at a certain moment, an intermedate position in which it is in line with the connecting rod $d^2$. Owing to this, when the arm $g^2$ swings from one of its end positions to the intermediate position, the piston $b^2$ will make its upstroke, when it will swing from the said intermediate position to its other end position and from the latter to the same intermediate position, the piston $b^2$ will oscillate in the neighborhood of its upper dead point and finally when it returns from the said intermediate position to its first end position, the piston $b^2$ will make its down stroke.

In the portion $a^2$ is provided a port $k$ which is uncovered when the piston $b^2$ arrives nearly at the end of its down stroke.

To the port $k$ is joined a conduit $l$ for the explosive mixture and the chamber of the charging pump is filled with explosive mixture at the same time as the uncovering above referred to takes place, owing to the vacuum produced in the chamber during the said stroke.

In the extension $a^0$ of the wall of the portion $a^1$ is provided a port $m^1$ so that when it is uncovered by the piston $c^1$, it establishes communication between the said chamber and the cylinder of the engine, and consequently, each time that a charge passes into the pump chamber, it enables the said charge to pass into the cylinder. The port $m^1$ is arranged at the very beginning of the extension $a^0$, in order to enable on the one hand the port $m^1$ to be uncovered by the piston $c^1$ during exhaust, when the port $k$ is uncovered by the piston $b^2$ (in consequence of which, owing to the suction produced in the cylinder by the exhaust and also owing to the induced flow of the gases contained in the said conduit $l$ when there is suction in the charging pump, a direct suction of fresh gases into the cylinder is obtained), and on the other hand the location of the port $m^1$ is such as to insure communication between the pump and the cylinder during the whole upward stroke of the pump in such manner that all the fresh gases drawn in by the pump, are transferred, without being subjected to any compression, into the cylinder.

An exhaust port $q$ is provided in the cylinder $a^1$ at such a point that it is uncovered by the piston $c^1$ when the exhaust must take place.

The upper face of the piston $c^1$ is provided in the known manner with a deflector or baffle plate suitable for guiding the fresh gases admitted into the cylinder, toward the cover of the said cylinder.

Figure 2:
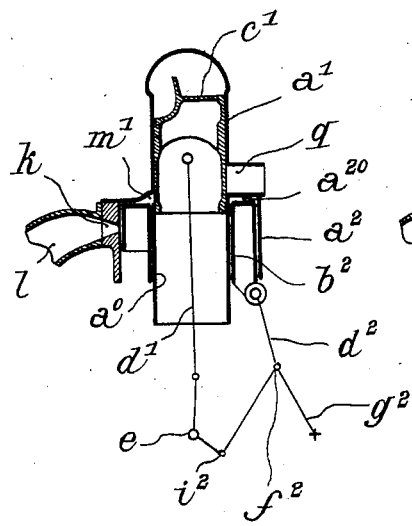
Figure 3:
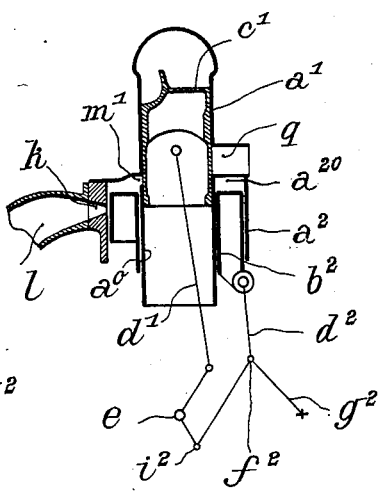
Figure 4:
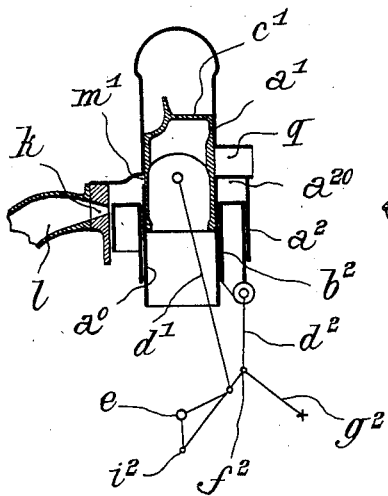
Figure 5:
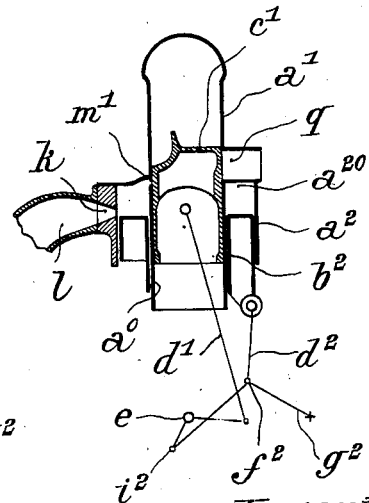
Figure 10:
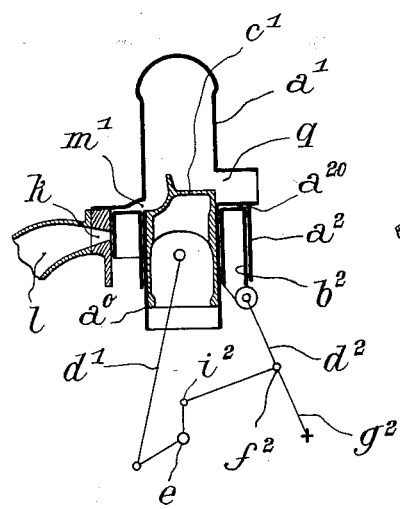
Figure 11:
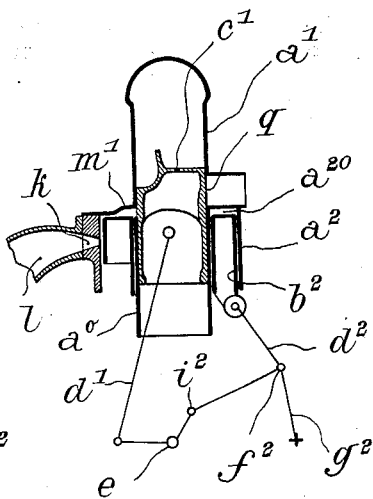
Figure 12:
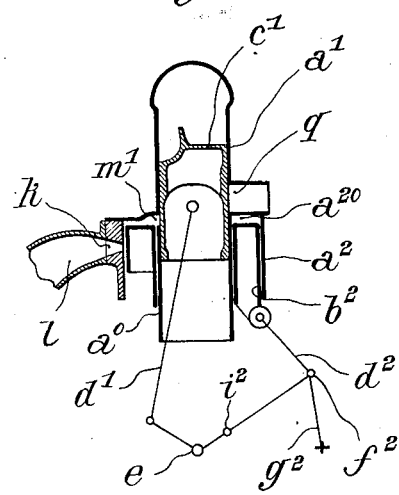
Figure 13:
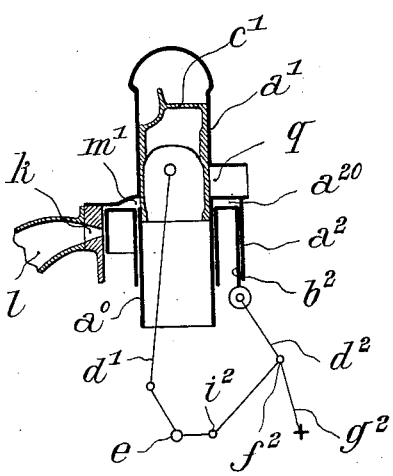

Assuming that the engine is in the respective position shown in Fig. 2, that is to say in which the ports $m^1$ and $q$ are covered by the piston $c^1$, and the port $k$ by the piston $b^2$, and a certain quantity of fresh gases confined under pressure in the cylinder, an explosion takes place and the pistons $c^1$ and $b^2$ will be driven downward; during the first part of their downstroke the piston $c^1$ keeps the ports $m^1$ and $q$ closed, and the piston $b^2$ keeps the port $k$ closed and a vacuum is produced in the chamber of the charging pump (Figs. 3 and 4). The pistons $c^1$ and $b^2$ continue their down stroke and, as shown in Fig. 5, the piston $b^2$ uncovers the port $k$, which, owing to the vacuum previously produced in the charging pump results in a charge being drawn into the said pump. On continuing its downstroke the piston $c^1$ uncovers, as shown in Fig. 6, first the exhaust port $q$, and then the port $m^1$ establishing communication between the cylinder and the pump, which result in the escape, through the port $q$, of a portion of burnt gases, and then, when the port $m^1$ is uncovered by the piston $c^1$, the drawing in—owing to partial vacuum produced in the cylinder by the exhaust—of a certain quantity of fresh gases into the cylinder. The admission of fresh gases into the cylinder is facilitated by the fact that the piston $b^2$ continuing to descend and to draw in the charge through the port $k$, there is produced a kind of current or draft which, acting in the conduit $l$, forces a certain quantity of gases contained in the said conduit, to pass into the said cylinder. The piston $b^2$ begins then its upstroke and at the same time the piston $c^1$ reaches the end of its down stroke (Fig. 7); then as shown in Fig. 8 the port $k$ is covered by the piston $b^2$, and the said piston $b^2$ begins to transfer the charge, drawn in as just described, into the cylinder of the engine. On the rise of the piston $b^2$ and of the piston $c^1$, during which the ports $m^1$ and $q$ remain uncovered as shown in Figs. 9 and 10, the effect just mentioned, or more accurately, the forcing of the said charge into the cylinder chamber, becomes more pronounced, and there takes place moreover, incomplete scavenging by the said charge, of the gases from the previous explosion, which have not yet been expelled. On the arrival of the piston $b^2$ at the end of its upstroke the piston $c^1$ continues its upstroke and closes, (as shown in Fig. 11) the ports $m^1$ and $q$ owing to which the said charge is confined in the said cylinder in which it is compressed. On continuation and completion of the rise of the piston $c^1$ (as shown in Figs. 12, 13 and 2) the piston $b^2$ is first lowered to a slight extent in order to rise afterward and arrive again at the end of its upstroke at the moment when the piston $c^1$ completes its rise. Owing to this the charge is given its final compression, and the whole engine being in the initial position, the operation goes on as before.

It is obvious that the invention is not limited to the previous construction shown and described but comprises any modifications within the scope of the claims.

What we claim as our invention and desire to secure by Letters Patent is:—

1. In an internal combustion engine of the type described comprising a working cylinder having a piston to reciprocate therein and also having a cylindrical extension, an annular chamber surrounding said extension of the working cylinder and forming with the latter an annular pump cylinder, a port being formed in the wall of the working cylinder to provide communication between the working cylinder and the annular pump cylinder at a point immediately adjacent to the head of the pump cylinder, and a port being provided to admit fresh gas to the pump cylinder, an annular piston to reciprocate axially on said cylindrical extension of the working cylinder and in the pump cylinder, and means for reciprocating the pump piston relatively to the working piston to cause the pump piston to uncover the fresh gas admission port while the intercommunicating port between the pump cylinder and the working cylinder is uncovered by the working piston whereby fresh gas passes across the top of the pump piston directly from the fresh gas admission port through the pump cylinder and into the working cylinder free of compression in the pump cylinder.

2. An internal combustion engine of the type described comprising a working cylinder having a cylindrical extension forming an annular chamber around it operative as a pump cylinder, working and pump pistons reciprocable in the respective cylinders, the pump piston being reciprocable axially on said cylindrical extension of the working cylinder, a port being formed in the wall of the working cylinder to provide communication between the latter and the pump cylinder, and a fresh gas supply port being provided for the pump cylinder, and means for reciprocating the pump piston relatively to the working piston to cause the pump piston to uncover the fresh gas supply port while the port for the working cylinder is open and to cause the pump piston to arrive at the end of its in-stroke slightly before the working piston, in making its in-stroke, covers the intermediate port between the pump cylinder and the working cylinder.

3. An internal combustion engine of the type described comprising working and pump cylinders having pistons reciprocable therein, the pump cylinder being provided with a fresh gas admission port adapted to be covered and uncovered by the pump piston, and an intercommunicating port being provided between the pump cylinder and working cylinder and adapted to be covered and uncovered by the piston in the working cylinder, and means for reciprocating the pump piston relatively to the working piston to cause the pump piston to uncover the fresh gas supply port at an intermediate point in the out-stroke of the pump piston while the intercommunicating port between the pump cylinder and the working cylinder is uncovered by the working piston to admit fresh gas direct from the fresh gas supply port to the working cylinder free from compression in the pump cylinder during the completion of the out-strokes of the pump and working pistons, and to cause the return stroke of the pump piston to force the fresh gas from the pump cylinder into the working cylinder.

In testimony whereof we have hereunto set our hands in presence of two subscribing witnesses.

CHARLES MAURICE PHILIPPE MONTBARBON.
GUSTAVE EMILE CHÉDRU.

Witnesses:
   HANSON C. COXE,
   PAUL BLUM.